Jan. 10, 1967 R. E. McLEAN 3,296,733
FISHING LURE
Filed Feb. 12, 1965

INVENTOR.
Robert E. McLean
BY John A. Hamilton
Attorney.

United States Patent Office 3,296,733
Patented Jan. 10, 1967

3,296,733
FISHING LURE
Robert E. McLean, 11003 E. 53rd St.,
Raytown, Mo. 64134
Filed Feb. 12, 1965, Ser. No. 432,187
6 Claims. (Cl. 43—42.06)

This invention relates to new and useful improvements in fishing lures and has as its principal object the provision, in a surface lure, of means combining desirable features of operation and appearance whereby better to induce fish to strike at it. These features include image or appearance, flashing light or color change, sound, and spraying or splashing of water, all causing said lure to resemble an insect or the like as said lure is pulled along the water surface.

A particular object of the invention is the provision of a lure including a rotor adapted to be rotated by action of water thereon as the lure is drawn along the surface, the rotation thereof having the triple functions of creating an effect of flashing light or changing colors, of creating a splashing or spray effect, and of creating a whirring noise, all of which features cause said lure to resemble more closely natural prey of the fish, and hence increase its effectiveness.

Other objects are simplicity and economy of construction, efficiency and dependability of operation, and adaptability for use in lures having a wide variety of general designs and appearances.

Figure 1:
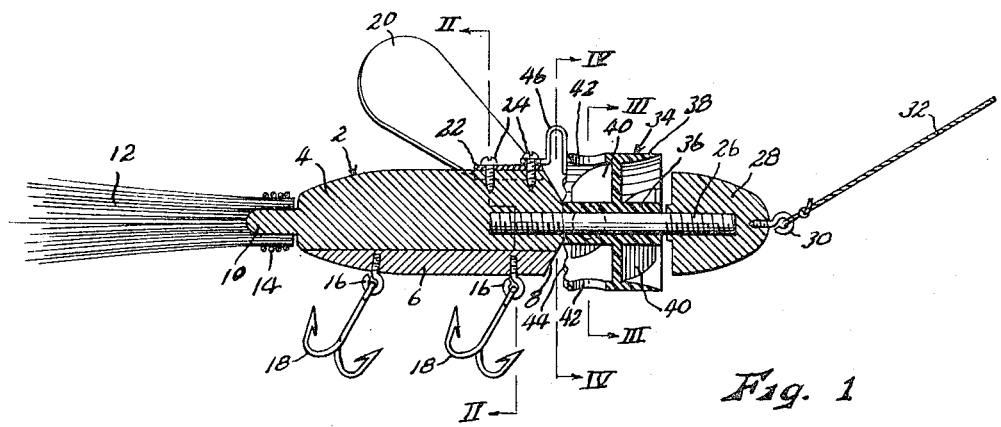
Figure 2:
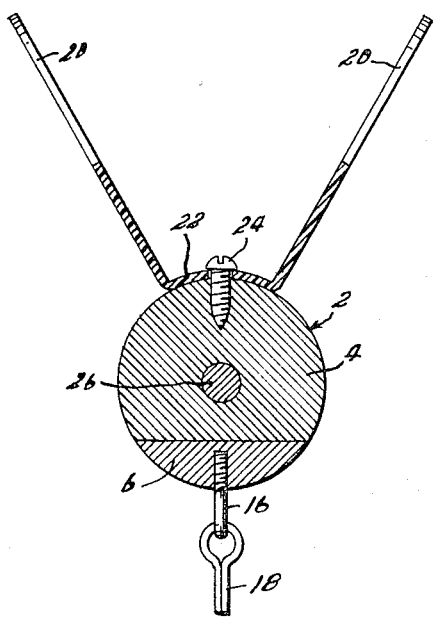
Figure 3:
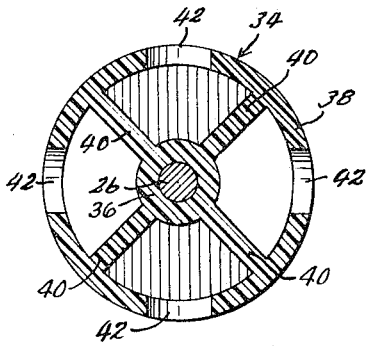
Figure 4:
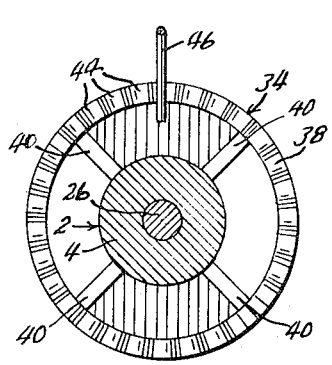
Figure 5:
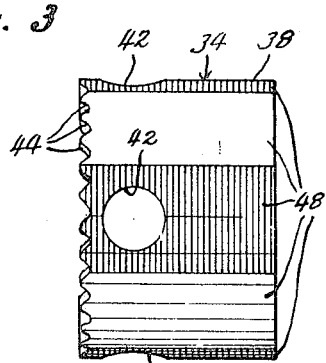

With these objects in view, as well as other objects which will appear in the course of the specification, reference will be had to the accompanying drawings, wherein:

FIG. 1 is a longitudinal sectional view through a fishing lure embodying the present invention, FIG. 2 is an enlarged fragmentary sectional view taken on line II—II of FIG. 1, FIG. 3 is an enlarged sectional view taken on line III—III of FIG. 1, FIG. 4 is an enlarged sectional view taken on line IV—IV of FIG. 1, and FIG. 5 is a side elevational view of the rotor only.

Like reference numerals apply to similar parts throughout the several views, and the numeral 2 applies generally to the body of the lure, said body being generally cylindrical in form and being adapted normally to rest horizontally on the water surface, the upper portion 4 thereof being formed of wood or other bouyant material, and the lower segmental portion 6 thereof, extending parallel to its axis, being formed of metal or other non-bouyant material to constitute a weight, for a purpose which will presently appear. The body as a whole, however, is bouyant so as to float on the water surface. The forward end of the body member 2 is conically tapered as indicated at 8, and is provided at its rearward end with an axial projection 10 to which a bucktail 12, "hula skirt" or other suitable visual lure may be affixed as by binding 14. Attached to the body as by screw eyes 16 are any desired number of fishhooks 18, two double hooks being shown by way of example only. Extending upwardly and rearwardly from the forward end portion of the body are a pair of wing members 20 shaped to resemble insect wings or the like. Said wings may be formed of thin flexible sheet plastic material of any desired color, and are preferably of unitary construction, being connected by an integral saddle portion 22 conforming to the surface of the body and secured thereto by screws 24, said wing members are sufficiently flexible that should a fish take one or both of them into its mouth when striking at the lure, they will collapse against the body so as not to interfere with the setting of the hooks.

A rod-like spindle 26 is disposed coaxially with the body member and extends forwardly therefrom, having its rearward end threaded into the body member, and its forward end threaded into a nose piece 28, which is also formed of bouyant material. Affixed in the forward end of the nose piece is a screw eye 30 to which the fishing line or leader 32 is attached. The nose piece is spaced apart from the body member, and a rotor designated generally by the numeral 34 is mounted rotatably on spindle 26 between said nose piece and body member. The function provided by the rotor form the central subject matter of the present invention.

Rotor 34 is essentially cylindrical and coaxial with spindle 26, being formed preferably of plastic or other lightweight material. It consists of a tubular hub 36 mounted rotatably on the spindle, a coaxial cylindrical shell 38 of larger diameter than the hub, and a plurality of integral vanes 40 extending between and interconnecting the hub and shell, said vanes being helically formed as shown. The shell is open at both ends, and is of larger diameter than nose piece 28, so that water can enter the forward end thereof as the lure is drawn through the water by line 32. Adjacent its rearward end, shell 38 has a plurality of holes 42 formed therethrough at angularly spaced apart intervals. The rearwardly facing edge of the shell is ridged or serrated as indicated at 44, and the free end portion of a spring wire 46 bears against this serrated edge. The opposite end of said wire is rigidly secured to body member 2 by any suitable means, such as by one of the screws 24 which secure wing members 20 to said body member. The external surface of shell 38 has broad longitudinal stripes 48 of contrasting colors imprinted thereon, alternating stripes of red and white being indicated in FIG. 5, although the specific colors and arrangements are of course a matter of choice.

In use, the lure is cast in the usual manner to rest buoyantly on the water surface, and then retrieved, either steadily or intermittently, as by reeling in the line or by a twitching of the fishing rod, all as well understood in the art. As the lure is thus drawn forwardly along the water surface, water enters the forward end of rotor shell 38 and passes therethrough and out its rearward end. As it passes through the shell, the water impinges against the helical vanes 40, which causes the rotor to revolve rapidly on spindle 26. This rotation has three separate functions each well adapted to increase its attraction to fish and thus to increase its efficiency. First, the rotation of the rotor imparts a visual impression of flashing light or changing color due to the brightly colored stripes 48 imprinted externally thereon. As is well known, this effect is quite attractive at least to certain types of fish. Secondly, rotation of the rotor causes the serrations 44 of the rearward edge thereof to pass rapidly over the resiliently deflectable end of spring wire 46, thereby creating a whirring or ratcheting noise which resembles the wing noise of certain insects and which also is attractive to fish. Any tendency of body member 2 to rotate with the rotor is prevented, and spring wire 46 is thus held stationary for the action of rotor serrations 44 thereagainst, by the weighted lower portion 6 of said body member, which maintains it upright in the water as shown. Third, as the water passes through rotor shell 38, a portion thereof will be thrown outwardly through holes 42 of the shell by centrifugal force created by the rotation of the rotor. At least some of said holes are always disposed above the water level, and water will thus be ejected through these holes in the form of a spray of droplets thrown upwardly and outwardly from the lure. This is attractive to fish because it resembles rather closely the splashing caused by insects which are the natural prey of certain fish. Also, a certain amount of air will be entrapped by turbulence in the water passing through the rotor and some of this air will escape below the water level in the form of bubbles, either through the forward end of the shell or through those holes 42 which are below the water level at any given moment. These bubbles are also natural effects resulting from the landing or swimming of an insect in the water, and hence tend to increase the attraction of the lure to fish.

The "spray" or "splash" effect already described is further enhanced by the conical shape of the forward end of body member 2, in that water emerging from the rearward end of the rotor shell impinges thereon and is deflected upwardly and outwardly from the lure body.

While I have shown and described a specific embodiment of my invention, it will be readily apparent that many minor changes of structure and operation should be made without departing from the spirit of the invention as defined by the scope of the appended claims.

What I claim as new and desire to protect by Letters Patent is:

1. A fishing lure comprising:
   (a) a buoyant, generally cylindrical body member adapted to float on the water surface with its axis horizontal, the forward end of said body member being conically tapered,
   (b) a non-buoyant weight included in said body member and disposed eccentrically to the axis thereof, whereby to resist rotation thereof about its axis as it rests in the water,
   (c) a fishhook attached to said body member,
   (d) a spindle carried coaxially by said body member and extending forwardly therefrom,
   (e) a nose piece affixed to the forward end of said spindle in spaced relation from said body member,
   (f) means for attaching a fishing line to the forward end of said nose piece, whereby said lure may be drawn forwardly along the water surface, and
   (g) a rotor comprising a hub rotatably mounted on said spindle, a cylindrical shell coaxial therewith, and helical vanes interconnecting said hub and shell, said shell being open at both ends and of larger diameter than said nose piece, whereby water may pass longitudinally therethrough and impinge on said vanes to rotate said rotor on said spindle, the external surface of said shell having areas of contrasting colors imprinted thereon.

2. A fishing lure comprising:
   (a) a buoyant, generally cylindrical body member adapted to float on the water surface with its axis horizontal, the forward end of said body member being conically tapered,
   (b) a non-buoyant weight included in said body member and disposed eccentrically to the axis thereof, whereby to resist rotation thereof about its axis as it rests in the water,
   (c) a fishhook attached to said body member,
   (d) a spindle carried coaxially by said body member and extending forwardly therefrom,
   (e) a nose piece affixed to the forward end of said spindle in spaced relation from said body member,
   (f) means for attaching a fishing line to the forward end of said nose piece, whereby said lure may be drawn forwardly along the water surface, and
   (g) a rotor comprising a hub rotatably mounted on said spindle, a cylindrical shell coaxial therewith, and helical vanes interconnecting said hub and shell, said shell being open at both ends and of larger diameter than said nose piece, whereby water may pass longitudinally therethrough and impinge on said vanes to rotate said rotor on said spindle, said shell having a plurality of holes formed radially therethrough intermediate its ends and at angularly spaced intervals about the periphery thereof.

3. A fishing lure comprising:
   (a) a buoyant, generally cylindrical body member adapted to float on the water surface with its axis horizontal, the forward end of said body member being conically tapered,
   (b) a non-buoyant weight included in said body member and disposed eccentrically to the axis thereof, whereby to resist rotation thereof about its axis as it rests in the water,
   (c) a fishhook attached to said body member,
   (d) a spindle carried coaxially by said body member and extending forwardly therefrom,
   (e) a nose piece affixed to the forward end of said spindle in spaced relation from said body member,
   (f) means for attaching a fishing line to the forward end of said nose piece, whereby said lure may be drawn forwardly along the water surface,
   (g) a rotor comprising a hub rotatably mounted on said spindle, a cylindrical shell coaxial therewith, and helical vanes interconnecting said hub and shell, said shell being open at both ends and of larger diameter than said nose piece, whereby water may pass longitudinally therethrough and impinge on said vanes to rotate said rotor on said spindle, the rearward edge of said shell being serrated, and
   (h) an elongated spring member having one end thereof affixed to said body member, the opposite free end portion of said spring member bearing yieldably against said serrated edge of said shell.

4. A fishing lure comprising:
   (a) a buoyant, generally cylindrical body member adapted to float on the water surface with its axis horizontal, the forward end of said body member being conically tapered,
   (b) a non-buoyant weight included in said body member and disposed eccentrically to the axis thereof, whereby to resist rotation thereof about its axis as it rests in the water,
   (c) a fishhook attached to said body member,
   (d) a spindle carried coaxially by said body member and extending forwardly therefrom,
   (e) a nose piece affixed to the forward end of said spindle in spaced relation from said body member,
   (f) means for attaching a fishing line to the forward end of said nose piece, whereby said lure may be drawn forwardly along the water surface,
   (g) a rotor comprising a hub rotatably mounted on said spindle, a cylindrical shell coaxial therewith, and helical vanes interconnecting said hub and shell, said shell being open at both ends and of larger diameter than said nose piece, whereby water may pass longitudinally therethrough and impinge on said vanes to rotate said rotor on said spindle, the external surface of said shell having areas of contrasting colors imprinted thereon, said shell having a plurality of holes formed therethrough intermediate its ends, and the rearward circular edge of said shell being serrated, and
   (h) an elongated spring member having one end thereof affixed to said body member, the opposite free end portion of said spring member bearing yieldably against said serrated edge of said shell.

5. A surface fishing lure comprising:
   (a) a buoyant body member having a fishhook attached thereto,
   (b) means for attaching a fishing line to said body member whereby the latter may be drawn along the surface of the water, and
   (c) a rotor carried for rotation by said body member on an axis coinciding with the direction of travel of said line, so disposed as to be at least partially submerged when said lure is floating on the water surface, and comprising a hollow, open-ended cylindrical member rotatable about its geometric axis, whereby water will pass therethrough as said lure is advanced, and vanes fixed in said cylindrical member and operable by water passing through said cylindrical member to cause rotation thereof, said cylindrical member having a series of holes formed therein intermediate the ends thereof and at angularly spaced intervals thereabout, whereby water is urged outwardly through said holes by centrifugal force as said rotor is rotated.

6. A surface fishing lure comprising:
(a) a buoyant body member having a fishhook attached thereto,
(b) means for attaching a fishing line to said body member whereby the latter may be drawn along the surface of the water, and
(c) a rotor carried for rotation by said body member on an axis coinciding with the direction of travel of said lure, so disposed as to be at least partially submerged when said lure is floating on the water surface, and comprising a hollow, open-ended cylindrical member rotatable about its geometric axis, whereby water will pass therethrough as said lure is advanced, and vanes fixed in said cylindrical member and operable by water passing through said cylindrical member to cause rotation thereof, said body member including a bevelled surface disposed immediately behind said rotor and inclined rearwardly therefrom, whereby water passing through said rotor is directed against and is deflected outwardly from said lure by said bevelled surface.

References Cited by the Examiner

UNITED STATES PATENTS

| | | | |
|---|---|---|---|
| 2,662,330 | 12/1953 | Ogburn | 43—42.16 |
| 2,833,078 | 5/1958 | Peltz | 43—42.31 |
| 2,853,826 | 9/1958 | Romeo | 43—42.31 |
| 2,911,751 | 11/1959 | Mason | 43—42.06 |

FOREIGN PATENTS 39,440   9/1915   Sweden.

SAMUEL KOREN, *Primary Examiner.*

D. J. LEACH, *Assistant Examiner.*